United States Patent [19]

Tanaka

[11] Patent Number: 4,947,971

[45] Date of Patent: Aug. 14, 1990

[54] CONTROL SYSTEM FOR A CLUTCH FOR A MOTOR VEHICLE

[75] Inventor: Hiroshi Tanaka, Tokyo, Japan

[73] Assignee: Fuji Jukogyo Kabushiki Kaisha, Tokyo, Japan

[21] Appl. No.: 301,559

[22] Filed: Jan. 23, 1989

[30] Foreign Application Priority Data

Feb. 16, 1988 [JP] Japan .................................. 63-33197

[51] Int. Cl.⁵ ............................................ B60K 41/02
[52] U.S. Cl. ............................... 192/0.033; 192/103 R
[58] Field of Search ................. 192/0.076, 21.5, 0.033, 192/103 R

[56] References Cited

U.S. PATENT DOCUMENTS

4,795,015  1/1989  Hibino et al. ..................... 192/0.076
4,805,751  2/1989  Ohkumo et al. ................. 192/0.076

FOREIGN PATENT DOCUMENTS

60-256632  12/1985  Japan .

Primary Examiner—Rodney H. Bonck
Attorney, Agent, or Firm—Martin A. Farber

[57] ABSTRACT

A system for controlling a clutch has an engine speed sensor for producing an engine speed signal and a controller for controlling the torque of the clutch at start of a vehicle in accordance with engine speed. An atmoshperic pressure sensor is provided for detecting the atmospheric pressure. In accordance with the detected atmospheric pressure at high altitude, the torque of the clutch is reduced.

5 Claims, 5 Drawing Sheets

CONTROL SYSTEM FOR A CLUTCH FOR A MOTOR VEHICLE

BACKGROUND OF THE INVENTION

The present invention relates to a control system for a clutch for a motor vehicle, and more particularly to a system for controlling the clutch when the vehicle is driven at high altitude.

An automobile provided with a continuously variable belt-drive transmission with an automatic clutch such as an electromagnetic clutch is disclosed by the applicant of the present patent application The clutch of the transmission is controlled by a control system in various operational modes such as a starting mode of a vehicle and a mode of lock-up engagement at steady state. One of the modes is selected in accordance with a position of a selector lever and driving conditions to control the clutch.

Japanese Patent Application Laid-Open No. 60-256632 discloses a control system for an electromagnetic clutch wherein clutch torque is increased with engine speed at the start of the vehicle and the clutch torque is controlled in accordance with output torque of the engine in the lock-up state when the vehicle speed is higher than a predetermined reference speed.

However, when the vehicle is driven at a high altitude, the intake air charging efficiency of the engine reduces with decrease of atmospheric pressure, resulting in a significant decrease of the engine torque. Referring to FIG. 4 showing a characteristic of an electromagnetic clutch, clutch torque Tc increases with increase of the engine speed. Thus, the vehicle is smoothly started in normal driving conditions with slipping of the clutch until the engine speed reaches a speed NI at which the clutch torque Tc equals engine torque Te at an engine stall point P. When the vehicle is driven at high altitude, the engine torque Te decreases as shown by the dashed line. As a result, the engine stall point drops to P', and hence the engine speed at which the clutch is engaged becomes lower (Ni). However, since the stall point P is not lowered, the clutch torque Tc at the point P is excessively large compared to the engine torque at point P'. Thus, starting characteristic greatly deteriorates.

SUMMARY OF THE INVENTION

The object of the present invention is to provide a system for controlling a clutch for a vehicle wherein the starting characteristic at high altitude is improved.

The other objects and features of this invention will become understood from the following description with reference to the accompanying drawings.

DETAILED DESCRIPTION OF THE PREFERRED EMBODIMENT

Figure 1:
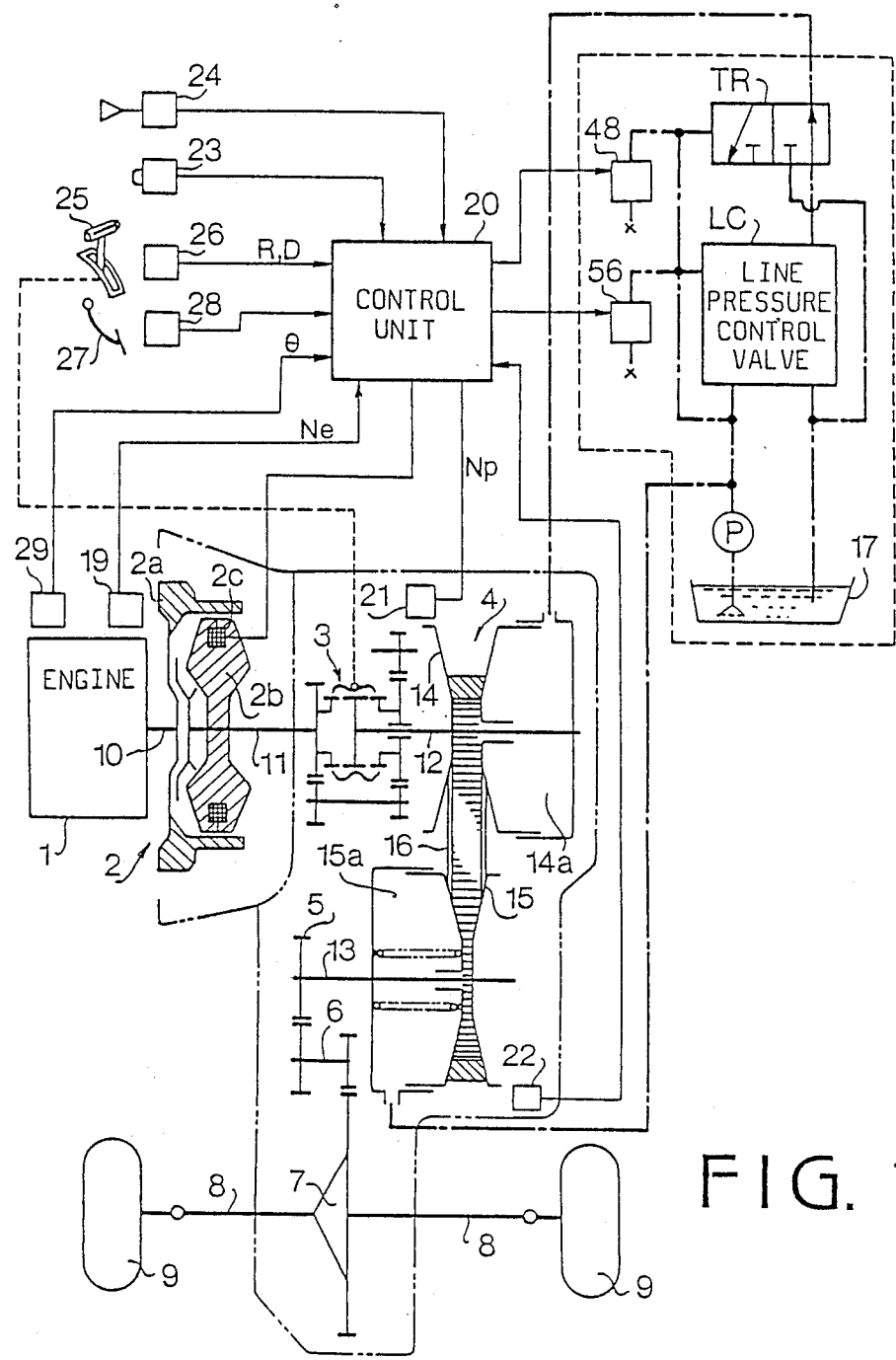
FIG. 1 is a schematic illustration of a system for controlling an electromagnetic clutch for a motor vehicle.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive transmission 4 is transmitted to axles 8 of vehicle driving wheels 9 through an output 13, a pair of intermediate reduction gears 5, an intermediate shaft 6, and a differential 7.

The electromagnetic powder clutch 2 comprises an annular drive member 2a connected to the crankshaft 10 of the engine 1, a driven member 2b secured to an input shaft 11 of the transmission 4, and a magnetizing coil 2c provided in the driven member 2b. Magnetic powder is provided in a gap between the drive member 2a and driven member 2b. When the magnetizing coil 2c is excited by the clutch current, driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive transmission 4, the selector mechanism 3 is provided between the input shaft 11 and a main shaft 12. The selector mechanism 3 is provided with a synchromesh mechanism comprising gears, hub, and sleeve for connecting the input shaft 11 and the main shaft 12 to selectively provide a driving position (D) and a reverse driving position (R).

The continuously variable belt-drive automatic transmission 4 has the main shaft 12 and the output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. Hydraulic cylinders 14a and 15a are communicated with an oil hydraulic control circuit. The cylinder 14a is supplied with pressurized oil by an oil pump P from an oil reservoir 17 passing through a line pressure control valve LC and a transmission ratio control valve TR. The cylinder 15a is applied with pressurized oil from the pump P. The hydraulic control circuit is responsive to vehicle speed, engine speed and throttle valve position for controlling the amount of oil supplied to the cylinders 14a and 15a. The pulleys 14 and 15 are operated by compressive forces of the cylinders so that the running diameter of the belt 16 is varied to infinitely change the transmission ratio.

An electronic control system for the clutch 2 and the belt-drive transmission 4 has an engine speed sensor 19, and rotating speed sensors 21 and 22 for respectively sensing rotating speed of the drive pulley 14 and the driven pulley 15. A choke switch 24 produces an output signal when a choke valve of the engine 1 is closed, and an air conditioner switch 23 produces an output signal at the operation of an air conditioner. A selector lever 25 connected to the selector mechanism 3 is provided with a select position sensor 26 for sensing the driving position and the reverse position (R). An accelerator pedal switch is provided for sensing the depression of an accelerator 27, and a throttle position sensor 29 is provided.

Output signals of the sensors and pulses of the switches are applied to an electronic control unit 20 which produces a clutch current control signal to the clutch 2 and a control signal for controlling the transmission ratio (i) and a line pressure control signal to the control circuit.

Figure 2A:
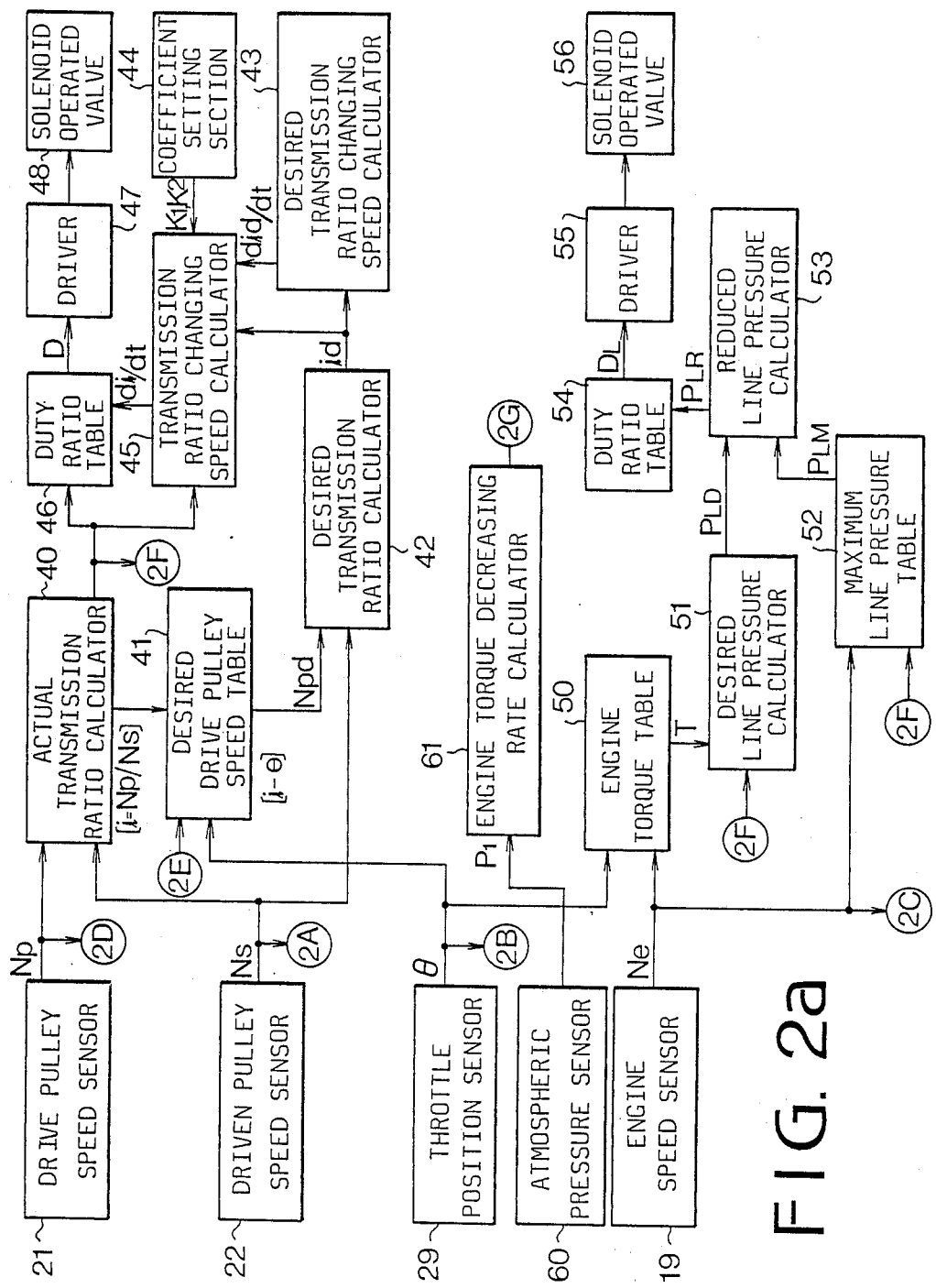
FIGS. 2a and 2b show a block diagram of a control unit according to the present invention.
Figure 2B:
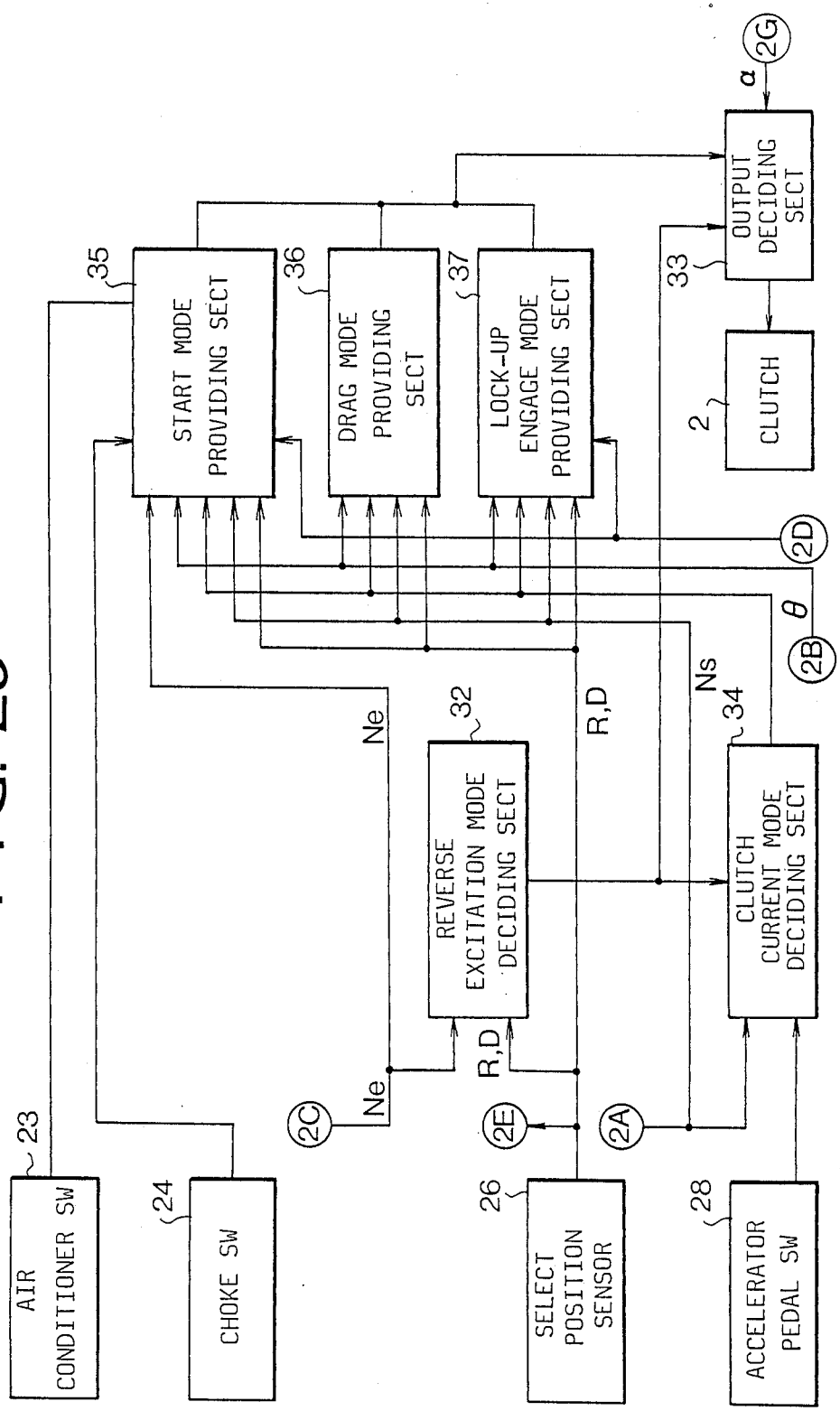

Referring to FIGS. 2a and 2b showing the control unit 20 of FIG. 1, a reverse excitation mode deciding section 32 is applied with engine speed signal Ne of the sensor 19 and drive position signal of the select position sensor 26. When the engine speed Ne is below 300 rpm, or the selector lever 25 is at a neutral position (N) or a parking position (P), the reverse excitation mode deciding section 32 produces a reverse excitation signal which is applied to an output deciding section 33, so that a small reverse current flows in the clutch 2 to release the clutch completely.

A clutch current mode section 34 is applied with signals from the reverse excitation mode deciding section 32 and accelerator pedal switch and vehicle speed signal V from driven pulley speed sensor 22 for deciding driving conditions such as starting mode to produce output signals. The output signals are applied to a start mode providing section 35, drag mode providing section 36, and clutch lock-up engage mode providing 37.

The start mode providing section 35 decides clutch current of starting characteristic dependent on the engine speed Ne at ordinary start or at closing of the choke switch 24 or air conditioner switch 33. The starting characteristic is corrected by signals from throttle valve opening degree $\theta$, vehicle speed $N_S$, and driving positions (D) and reverse position (R).

The drag mode providing section 36 decides a small drag current when the accelerator pedal 27 is released at a low speed in the driving position and the reverse position for providing a drag torque to the clutch 2 for the reduction of clearances formed in the transmission and for the smooth start of the vehicle.

The clutch lock-up engage mode providing section 37 decides a lock-up current in response to the vehicle speed $N_S$ and throttle opening degree $\theta$ at the driving position and reverse position for entirely engaging the clutch 2. Outputs of the sections 35, 36 and 37 are applied to the output deciding section 33 to control the clutch current.

A system for controlling the transmission ratio and the line pressure will now be described. Output signals $N_P$ and $N_S$ of sensors 21, 22 are fed to an actual transmission ratio calculator 40 to produce an actual transmission ratio i in accordance with $i = N_P/N_S$. The actual transmission ratio i and output signal $\theta$ of the throttle position sensor 29 are fed to a desired drive pulley speed table 41 to derive a desired drive pulley speed Npd in accordance with values of the ratio i and signal $\theta$. The desired drive pulley speed Npd and the driven pulley speed $N_S$ are fed to a desired transmission ratio calculator 42 to calculate a desired transmission ratio id in accordance with the speeds Npd and $N_S$ which corresponds to vehicle speed.

The desired transmission ratio id is fed to a desired transmission ratio changing speed calculator 43 which produces a desired transmission ratio changing speed (rate) did/dt. The speed did/dt is the amount of change of the desired transmission ratio id during a predetermined time interval. A coefficient setting section 44 is provided for producing coefficients K1 and K2. The actual transmission ratio i, desired transmission ratio id, desired transmission ratio changing speed did/dt and coefficients K1 and K2 are applied to a transmission ratio changing speed calculator 45 to produce a transmission ratio changing speed (rate) di/dt from the following formula.

$$di/dt = K1 \,(id - i) + K2 \cdot did/dt$$

In the formula, the term of $(id - i)$ is a control quantity dependent on the difference between the desired and actual transmission ratios and did/dt is a term for advancing the delay in phase caused by a first order lag in the system.

The speed di/dt and actual ratio i are applied to a duty ratio table 46 to derive a duty ratio D in accordance with $D = f\,(di/dt, i)$ using a table at upshift and downshift of the transmission. The duty ratio D is supplied to a solenoid operated on-off valve 48 through a driver 47. The valve 48 is provided in the hydraulic circuit, for shifting a spool of the transmission ratio control valve TR to control the transmission ratio.

On the other hand, engine speed Ne from the engine speed sensor 19 and throttle opening degree $\theta$ from the throttle position sensor 29 are applied to an engine torque table 50 to derive an engine torque T. The engine torque T and the actual transmission ratio i from the calculator 40 is applied to a desired line pressure calculator 51 to obtain a desired line pressure $P_{LD}$ by multiplying a necessary line pressure dependent on the engine torque T by the actual transmission ratio i.

In a hydraulic circuit of the control system oil pressure discharged from the pump varies in accordance with the change of the engine speed Ne, so a that a maximum line pressure $P_{LM}$ also varies. In order to detect the variance of the maximum line pressure $P_{LM}$, the control unit is provided with a maximum line pressure table 52 to which the engine speed Ne and the actual transmission ratio i are supplied. Therefore, the maximum line pressure $P_{LM}$ is obtained.

The desired line pressure $P_{LD}$ and the maximum line pressure $P_{LM}$ applied to a reduced line pressure calculator 53 wherein a reduced line pressure $P_{LR}$ is calculated based on the proportion of the desired line pressure $P_{LD}$ to the maximum line pressure $P_{LM}$. The line pressure $P_{LR}$ is applied to a duty ratio table 54 to derive a duty ratio $D_L$ corresponding to the reduced line pressure $P_{LR}$. The duty ratio $D_L$ is supplied to a driver 55 which operates a solenoid operated on-off valve 56 at the duty ratio $D_L$. The valve 56 is provided in the hydraulic circuit, for shifting a spool of the line pressure control valve LC to control the line pressure.

A system for controlling the electromagnetic clutch when the vehicle is driven at high altitude is described. The control unit has an atmospheric pressure sensor 60 for detecting atmospheric pressure. The detected atmospheric pressure P1 is fed to an engine torque decreasing rate calculator 61 where an engine torque decreasing rate $\alpha$ is calculated as follows.

$$\alpha = f(P1/PO),$$

where PO is standard atmospheric pressure at mean sea level, that is, 760 mmHg. The decreasing rate $\alpha$ is applied to the output deciding section 33 as a correcting coefficient, thereby correcting the clutch current at the start mode. A clutch current $I_C$ for the start mode is normally calculated at the output deciding section 33 in accordance with $$I_C = f(N_e).$$

However, when the vehicle is driven under a low pressure at high altitude, the clutch current $I_C$ is calculated as, $$I_C = f(N_e)\alpha$$

In operation, while the vehicle is at a stop, cylinder 15a of the driven pulley 15 is supplied with line pressure, and the cylinder 14a of the drive pulley 14 is drained, since the $N_P$, $N_s$, $\theta$ are zero and duty ratio D is zero. Thus, in the pulley and belt device of the continuously variable belt-drive transmission, the drive belt 16 engages with the driven pulley 15 at a maximum running diameter to provide the largest transmission ratio (low speed stage).

When the accelerator pedal is depressed, the clutch current increases progressively with increase of engine speed. The electromagnetic clutch 2 is gradually engaged, transmitting the engine power to the drive pulley 14. The power of the engine is transmitted to the output shaft 13 at the largest transmission ratio by the drive belt 16 and driven pulley 15, and further transmitted to axles of the driving wheels 9. Thus, the vehicle started. When the vehicle speed (output signal $N_s$) exceeds a predetermined value, the clutch 2 is entirely engaged.

When the throttle valve is opened for acceleration of the vehicle, the desired transmission ratio id is calculated at the calculator 42 based on the desired drive pulley speed derived from the table 41 and on the throttle position $\theta$. Further, the desired transmission ratio changing speed (rate) did/dt and transmission ratio changing speed (rate) di/dt are calculated at calculators 43 and 45 based on the actual transmission ratio i, desired transmission ratio id and coefficients $K_1$ and $K_2$. The transmission ratio changing speed di/dt is fed to the duty ratio table 46, so that duty ratio D for valve 48 is obtained from the table 46.

When the accelerator pedal is released, the transmission ratio changing speed di/dt becomes negative. Accordingly the value of the duty ratio D becomes larger than the neutral value, so that oil is supplied to the cylinder 14a to upshift the transmission. When the actual transmission ratio i reaches the desired transmission ratio id, the changing speed di/dt becomes zero, so that the upshifting operation stops.

When the drive pulley speed is substantially constant, the desired transmission ratio id calculated based on the desired drive pulley speed Npd and the driven pulley speed $N_S$ have the same value as the desired transmission ratio calculated based on the driven pulley speed Ns and throttle opening degree $\theta$. In a range where the drive pulley speed varies, a proper desired transmission ratio id is calculated based on a desired drive pulley speed Npd derived from the table 41.

As the difference between the desired ratio id and actual ratio i becomes large and the desired transmission ratio changing speed di/dt becomes large, the duty ratio D for the valve 48 becomes large, thereby increasing the actual transmission ratio changing (rate).

When the opening degree of the throttle valve is reduced for deceleration, the duty ratio D is reduced along a low engine speed line, thereby draining the cylinder 14a. Thus, the transmission is downshifted. The transmission ratio changing speed at downshifting increases with reducing of the duty ratio D.

The control operation of line pressure will be described hereinafter. From the engine torque table 50, a torque T is obtained in accordance with throttle opening degree $\theta$ and engine speed $N_e$, which is applied to desired line pressure table 51. The desired line pressure $P_{LD}$ and the maximum line pressure $P_{LM}$ obtained from table 52 are fed to the reduced line pressure calculator 53. The calculator 53 calculates a reduced line pressure $P_{LR}$. The solenoid operated on-off valve 56 is operated at a duty ratio $D_L$ corresponding to the reduced line pressure $P_{LR}$. The line pressure is applied to cylinder 15a to hold the belt 16 at a necessary minimum force, the transmitting torque at which is slightly larger than torque T. Thus, power is transmitted through the transmission without slipping of the belt.

Figure 3:
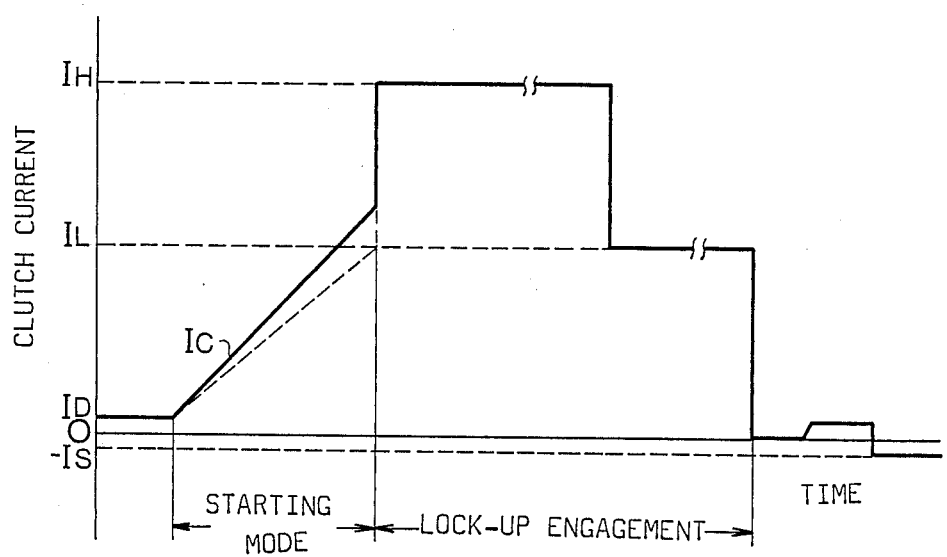
FIG. 3 is a graph showing a variation of clutch current.

Referring to FIG. 3, at the D-range, if the accelerator pedal is not depressed, a small drag current $I_D$ flows to produce a small drag torque, thereby reducing the amount of play between gears and decreasing the static friction torque in the belt and pulley device. When the accelerator pedal is depressed, the clutch current $I_C$ in proportion to engine speed flows. When the vehicle speed reaches a predetermined speed, a large lock-up current $I_H$ for entirely engaging the clutch flows to lock up the clutch 2. When the accelerator pedal 27 is released to decelerate the vehicle, a small lock-up current $I_L$ flows, so that electric power consumption is reduced. When the vehicle speed decreases below a predetermined value, the clutch current becomes zero, thereby preventing the engine from stalling. When the vehicle speed further decreases below a predetermined value, the small drag current $I_D$ flows. At the N-range or P-range, a reverse current $-I_S$ flows in the coil 2c so as to eliminate remaining electromagnetic force.

Figure 4:
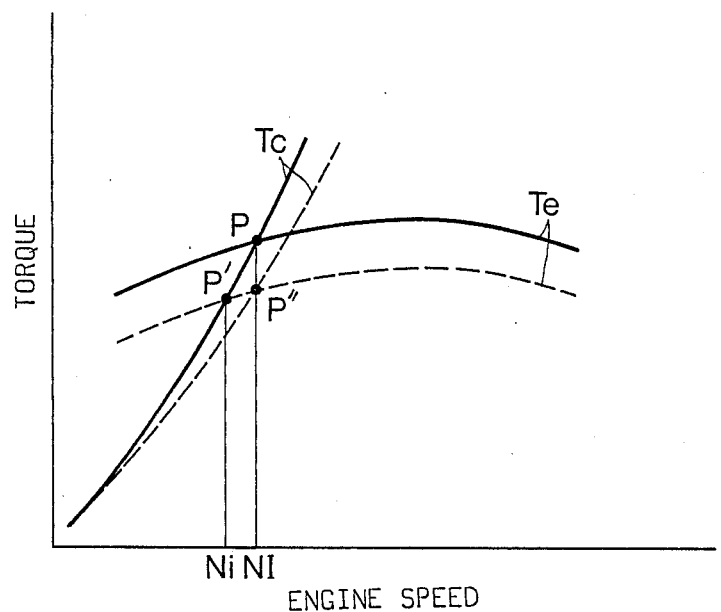
FIG. 4 is a graph showing relationships between engine torque and engine speed and between clutch torque and engine speed.

When the vehicle is driven at a low altitude, namely under the standard atmospheric pressure of 1 atm (760 mm Hg), the engine torque decreasing rate $\alpha$ calculated at the calculator 61 dependent on the atmospheric pressures P1 and PO is 1, since both the pressures are equal. Accordingly, the clutch current $I_C$ at the mode is not corrected. On the other hand, when the vehicle is driven at high altitude, the ambient atmospheric pressure P1 reduces so that engine torque reducing rate $\alpha$ becomes smaller than 1 ($\alpha < 1$). The reducing rate approaches zero as the altitude rises. Accordingly, the clutch current $I_C$ at the start mode is corrected in the output deciding section 33. Consequently, the clutch torque increases as shown by a dashed line in FIG. 3 more slowly than the solid line, thereby decreasing the clutch torque correspondingly. Thus, the engine stall point changes from the point P' to a point P'' as shown in FIG. 4, the engine speed at which being substantially equal to the engine speed NI at low altitudes. Thus, the characteristics of the engine torque and the clutch approximate each other when driven at low altitude.

The lock-up current for the lock-up engage mode may be decreased so as to correspond to the reduction of the engine torque. Furthermore, the present invention may be applied to other automatic clutches besides electromagnetic clutches.

From the foregoing, it will be understood that the present invention provides a clutch control system where the starting characteristic and the driveability are improved. Since the engine torque decreasing rate can be accurately detected dependent on the variation of atmospheric pressure, the clutch can be controlled in accordance with the altitude where the vehicle is driven.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a system for controlling a clutch for a motor vehicle having an engine, the system having engine speed detecting means for detecting engine speed and for producing a corresponding engine speed signal, and calculating means responsive to the engine speed signal for calculating torque of the clutch at starting of the vehicle and for producing a corresponding clutch torque signal for controlling actual torque of the clutch, the improvement in the system comprising atmospheric pressure detecting means for detecting actual atmospheric pressure and for producing a corresponding actual atmospheric pressure signal, compensating means responsive to the actual atmospheric pressure signal for reducing the torque of the clutch without disengaging the clutch, upon decreasing of the actual atmospheric pressure, via said calculating means, for controlling the clutch so as to keep engine speed of an engine stall point substantially constant independent of change of the actual atmospheric pressure.

2. The system according to claim 1 wherein the clutch is an electromagnetic clutch.

3. The system according to claim 1, wherein
the compensating means calculates a rate according to the actual atmospheric pressure and standard atmospheric pressure and said calculating means compensates the calculated torque of the clutch by multiplying the clutch torque signal with the rate as a correcting coefficient.

4. The system according to claim 3, wherein
said rate is a function of the actual atmospheric pressure divided by the standard atmospheric pressure.

5. The system according to claim 1, wherein
the compensating means comprises an engine torque decreasing rate calculator which continuously reduces the torque of the clutch as a function of decreasing actual atmospheric pressure.

* * * * *